United States Patent
Sato et al.

(10) Patent No.: US 9,545,918 B2
(45) Date of Patent: Jan. 17, 2017

(54) CONTROL DEVICE OF HYBRID VEHICLE

(71) Applicant: Toyota Jidosha Kabushiki Kaisha, Toyota-shi, Aichi-ken (JP)

(72) Inventors: Daiki Sato, Toyota (JP); Masatoshi Ito, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 138 days.

(21) Appl. No.: 14/560,427

(22) Filed: Dec. 4, 2014

(65) Prior Publication Data

US 2015/0158484 A1    Jun. 11, 2015

(30) Foreign Application Priority Data

Dec. 10, 2013 (JP) .................................. 2013-255330

(51) Int. Cl.
| | | |
|---|---|---|
| *B60W 20/00* | (2016.01) | |
| *B60W 10/08* | (2006.01) | |
| *B60K 6/445* | (2007.10) | |
| *B60W 10/06* | (2006.01) | |

(52) U.S. Cl.
CPC .............. *B60W 20/40* (2013.01); *B60K 6/445* (2013.01); *B60W 10/06* (2013.01); *B60W 10/08* (2013.01); *B60W 2510/083* (2013.01); *B60W 2710/065* (2013.01); *B60W 2710/0666* (2013.01); *B60W 2710/083* (2013.01); *Y02T 10/6239* (2013.01); *Y02T 10/6286* (2013.01);
(Continued)

(58) Field of Classification Search
CPC ...... B60W 20/00; B60W 10/06; B60W 10/08; B60W 20/17; B60W 30/20; B60W 10/02; B60W 2510/0604; B60W 2510/0638; B60W 2510/081; B60W 2520/10; B60W 2540/12; B60W 2710/083; B60W 10/023; B60W 10/10
See application file for complete search history.

(56) References Cited

U.S. PATENT DOCUMENTS

| | | | |
|---|---|---|---|
| 2008/0004780 A1 | 1/2008 | Watanabe et al. | |
| 2009/0018715 A1 | 1/2009 | Kanayama | |

(Continued)

FOREIGN PATENT DOCUMENTS

| | | |
|---|---|---|
| JP | 2005-184999 A | 7/2005 |
| JP | 2007-210409 A | 8/2007 |

(Continued)

OTHER PUBLICATIONS

JP2007210409_machine translation, Shinichi 2007.*
WO2012073323A1_machine translation, Takeshi 2012.*

*Primary Examiner* — Jelani Smith
(74) *Attorney, Agent, or Firm* — Dinsmore & Shohl LLP

(57) ABSTRACT

A control device of a hybrid vehicle causing a first electric motor to apply an engine reduction torque for reducing a rotation speed of an engine at the time of stopping a rotation of the engine, when it is determined that an output torque of a second electric motor is in a predetermined torque range near zero including zero during transition to stopping the rotation of the engine with the engine reduction torque applied by a first electric motor at the time of stopping the rotation of the engine being set to a predetermined engine reduction torque, the engine reduction torque is changed from the predetermined engine reduction torque.

14 Claims, 8 Drawing Sheets

(52) U.S. Cl.
CPC ........ *Y02T 10/7258* (2013.01); *Y10S 903/915* (2013.01); *Y10S 903/93* (2013.01)

(56) References Cited

U.S. PATENT DOCUMENTS

| | | | |
|---|---|---|---|
| 2010/0004089 A1* | 1/2010 | Iwase | B60K 6/445 477/3 |
| 2014/0248991 A1* | 9/2014 | Harada | B60K 6/445 477/3 |

FOREIGN PATENT DOCUMENTS

| | | | | |
|---|---|---|---|---|
| JP | 2007210409 A | * | 8/2007 | |
| JP | 2008-006945 A | | 1/2008 | |
| JP | 2009-012726 A | | 1/2009 | |
| JP | 2009-274554 A | | 11/2009 | |
| JP | WO 2012073323 A1 | * | 6/2012 | ............ B60K 6/445 |
| JP | 2013-151209 A | | 8/2013 | |

* cited by examiner

CONTROL DEVICE OF HYBRID VEHICLE

CROSS-REFERENCE TO RELATED APPLICATION

This patent application is based upon and claims priority from Japanese Patent Application No. 2013-255330, filed on Dec. 10, 2013, incorporated herein by reference.

TECHNICAL FIELD

The present invention relates to a control device of a hybrid vehicle including a power distribution type electric differential portion and relates to a technique of reducing tooth-hitting noise.

BACKGROUND ART

A hybrid vehicle is well known that includes an electric differential portion having a differential mechanism distributing power from an engine to a first electric motor and an output rotating member and a second electric motor coupled to the output rotating member in a power transmittable manner such that a differential state of the differential mechanism is controlled by controlling an operating state of the first electric motor. For example, this corresponds to a hybrid vehicle described in Japanese Laid-Open Patent Publication No. 2009-012726. Japanese Laid-Open Patent Publication No. 2009-012726 discloses that an engine is subjected to the action of negative torque by the first electric motor to forcibly reduce the engine rotation speed in the process of stopping the engine, thereby shortening a time of passage through a resonance rotation speed range (i.e., a resonance rotation speed range in which the frequency of engine vibration matches the resonance frequency of a power transmission system (a power transmission path, a drive system, a driveline)) on the side lower than the idling rotation speed of the engine.

SUMMARY OF THE INVENTION

Problem to be Solved by the Invention

The hybrid vehicle as described above may generate a chattering noise (tooth-hitting noise) of backlash (e.g., a gap disposed in a meshing portion between gears having gear teeth etc. meshed with each other) in a gear mechanism making up the electric differential portion, for example. For example, while mutual pressing force of gears is relatively weak in a meshing portion, if vibrations due to rotation variation of the engine are transmitted to the meshing portion, tooth surfaces of meshed gears hit each other due to repeated mutual collision and separation in the meshing portion and may generate a tooth-hitting noise that is so-called rattling noise. More specifically, when output torque of the second electric motor is small (e.g., when the output torque of the second electric motor comes close to near zero including a value of zero [Nm] and the second electric motor enters a floating state), the mutual pressing force of gears becomes relatively weak in a certain meshing portion subject to the output torque of the second electric motor and the tooth-hitting noise as described above easily occurs. On the other hand, if the engine is subjected to the action of the negative torque by the first electric motor as described above in the stopping process of the engine, since a direct torque is applied to the output rotating member, the output torque of the second electric motor must be changed in accordance with a drive request amount in this case. Therefore, the second electric motor may enter the floating state in the stopping process of the engine. In such a case, it is conceivable that the output torque of the second electric motor is generated to press the gears against each other so as to suppress or avoid the occurrence of the tooth-hitting noise; however, this may prevent realization of the drive request amount. The problem as described above is unknown and no proposal has hitherto been made on satisfying both the realization of the drive request amount and the suppression or avoidance of occurrence of the tooth-hitting noise at the time of provision of control of forcibly reducing the engine rotation speed by the first electric motor in the stopping process of the engine.

The present invention was conceived in view of the situations and it is therefore an object of the present invention to provide a control device of a hybrid vehicle capable of suppressing or avoiding occurrence of tooth-hitting noise while realizing a drive request amount in the case of application of an engine reduction torque for reducing an engine rotation speed by the first electric motor when rotation of the engine is stopped.

Means for Solving the Problem

To achieve the object, the first aspect of the invention provides (a) a control device of a hybrid vehicle including an electric differential portion having a differential mechanism distributing power from an engine to a first electric motor and an output rotating member and a second electric motor coupled to the output rotating member in a power transmittable manner such that a differential state of the differential mechanism is controlled by controlling an operating state of the first electric motor, the control device of a hybrid vehicle causing the first electric motor to apply an engine reduction torque for reducing a rotation speed of the engine at the time of stopping the rotation of the engine, wherein (b) when it is determined that an output torque of the second electric motor is in a predetermined torque range near zero including zero during transition to stopping the rotation of the engine when the engine reduction torque applied by the first electric motor at the time of stopping the rotation of the engine being set to a predetermined engine reduction torque, the engine reduction torque is changed from the predetermined engine reduction torque.

Effects of the Invention

Consequently, when the rotation speed of the engine is reduced by the first electric motor, if the output torque of the second electric motor is in the predetermined torque range within which the tooth-hitting noise easily occurs so as to realize the drive request amount, the engine reduction torque itself generated by the first electric motor is changed. The output torque of the second electric motor for realizing the drive request amount is accordingly changed from the torque value in the case of the engine reduction torque set to the predetermined engine reduction torque and, therefore, the output torque of the second electric motor can be kept away from the predetermined torque range. In other words, by changing the engine reduction torque itself of the first electric motor, the output torque of the second electric motor can be kept out of the predetermined torque range while the drive request amount is secured. Therefore, if the engine reduction torque is applied by the first electric motor when the rotation of the engine is stopped, the occurrence of the tooth-hitting noise can be suppressed or avoided while the drive request amount is realized.

The second aspect of the invention provides the control device of a hybrid vehicle recited in the first aspect of the invention, wherein the predetermined torque range is a torque range between negative and positive near-zero threshold values across zero, and wherein when the output torque of the second electric motor is in the predetermined torque range during transition of stopping the rotation of the engine, when the output torque of the second electric motor is closer to the positive threshold value of the predetermined torque range, the engine reduction torque is changed to be smaller than the predetermined engine reduction torque, while when the output torque of the second electric motor is closer to the negative threshold value of the predetermined torque range, the engine reduction torque is changed to be larger than the predetermined engine reduction torque. Consequently, if the engine reduction torque is changed from the predetermined engine reduction torque, the change width can be made smaller. As a result, when the present invention is applied to the vehicle, a workload for adaptation and a workload for evaluation can be reduced that are required for accommodating trade-offs (e.g., changes in engine stop shock and uncomfortable feeling associated with change in the lowering gradient of the engine rotation speed) associated with changing the engine reduction torque from the predetermined engine reduction torque.

The third aspect of the invention provides the control device of a hybrid vehicle recited in the first or second aspect of the invention, wherein variation of a drive request amount corresponding to an accelerator operation is made slower during transition at the time of stopping the rotation of the engine as compared to when it is not during the transition. Consequently, although the output torque of the second electric motor may be in the predetermined torque range in accordance with variation in the drive request amount due to the accelerator operation during transition to stopping the rotation of the engine, the state of the output torque of the second electric motor out of the predetermined torque range can be maintained as long as possible to reduce occurrence frequency of the tooth-hitting noise associated with an accelerator operation performed during transition to stopping the rotation of the engine.

The fourth aspect of the invention provides the control device of a hybrid vehicle recited in any one of the first to third aspects of the invention, wherein when a drive request amount is varied such that the output torque of the second electric motor varies in a direction toward the predetermined torque range during transition of stopping the rotation of the engine, the engine reduction torque being applied by the first electric motor is changed such that the output torque of the second electric motor varies in a direction away from the predetermined torque range. Therefore, this enables reduction in the occurrence frequency of the tooth-hitting noise associated with an accelerator operation performed during transition to stopping the rotation of the engine.

The fifth aspect of the invention provides the control device of a hybrid vehicle recited in any one of the first to fourth aspects of the invention, wherein if the engine reduction torque is changed from the predetermined engine reduction torque, the engine reduction torque is changed to one of a plurality of types of changed values that are set in correspondence to each value of the predetermined engine reduction torque causing the output torque of the second electric motor to stay in the predetermined torque range. Consequently, the engine reduction torque is changed to a plurality of values to be changed relative to the predetermined engine reduction torque. This reduces a possibility of the output torque of the second electric motor being in the predetermined torque range in accordance with variation of the drive request amount due to an accelerator operation performed during transition to stopping the rotation of the engine, thereby enabling reduction in the occurrence frequency of the tooth-hitting noise associated with an accelerator operation performed during transition to stopping the rotation of the engine.

The sixth aspect of the invention provides the control device of a hybrid vehicle recited in any one of the first to fifth aspects of the invention, wherein the predetermined engine reduction torque is an adapted value predefined such that a gradient of variation is set to an optimum gradient of variation when the rotation speed of the engine is reduced by the first electric motor. Consequently, the engine stop shock, the uncomfortable feeling, etc. are hardly given to a driver due to forcible reduction of the engine rotation speed by the first electric motor.

The seventh aspect of the invention provides the control device of a hybrid vehicle recited in any one of the first to sixth aspects of the invention, wherein the predetermined torque range is a tooth-hitting noise occurring region predefined as a range of the output torque of the second electric motor facilitating occurrence of tooth-hitting noise in the electric differential portion. Consequently, if the engine reduction torque is applied by the first electric motor when the rotation of the engine is stopped, the occurrence of the tooth-hitting noise can be suppressed or avoided while the drive request amount is realized.

MODE FOR CARRYING OUT THE INVENTION

In the present invention, preferably, the second electric motor is coupled directly or indirectly via a gear mechanism to an output rotating member of the differential mechanism in a power transmittable manner. The gear mechanism is made up of, for example, a gear pair coupling two shafts in a power transmittable manner, a differential gear device such as planetary gears and bevel gears, a single-stage speed reducer or speed increaser made up of the differential gear device, and various planetary gear type multi-stage transmissions having, for example, two forward speeds, three forward speeds, or more shift stages with a plurality of sets of rotating elements of a planetary gear device selectively coupled by friction engagement devices to achieve a plurality of gear stages (shift stages) in an alternative manner. For the friction engagement devices in the planetary gear type multi-stage transmissions, hydraulic friction engagement devices are widely used, such as multi-plate and single-plate clutches and brakes engaged by hydraulic actuators or belt type brakes. Although an oil pump supplying operating oil for engagement actuation of the hydraulic friction engagement devices may be, for example, an oil pump driven by an engine to discharge the operating oil, the oil pump may be driven by a dedicated electric motor etc. disposed separately from the engine.

Preferably, the differential mechanism is a device having three rotating elements, i.e., a first rotating element coupled to the engine, a second rotating element coupled to the first electric motor, and a third rotating element coupled to the output rotating member. The differential mechanism is, for example, a single pinion type planetary gear device; the first rotating element is a carrier of the planetary gear device; the second rotating element is a sun gear of the planetary gear device; and the third rotating element is a ring gear of the planetary gear device.

Preferably, the engine and the differential mechanism may operatively be coupled in any manner and, for example, the engine and the differential mechanism may have a pulsation absorbing damper (vibration damping device), a direct clutch, a direct clutch with a damper, or a hydraulic power transmission device interposed therebetween, or the engine and the differential mechanism may always be coupled.

An example of the present invention will now be described in detail with reference to the drawings.

EXAMPLE

Figure 1:
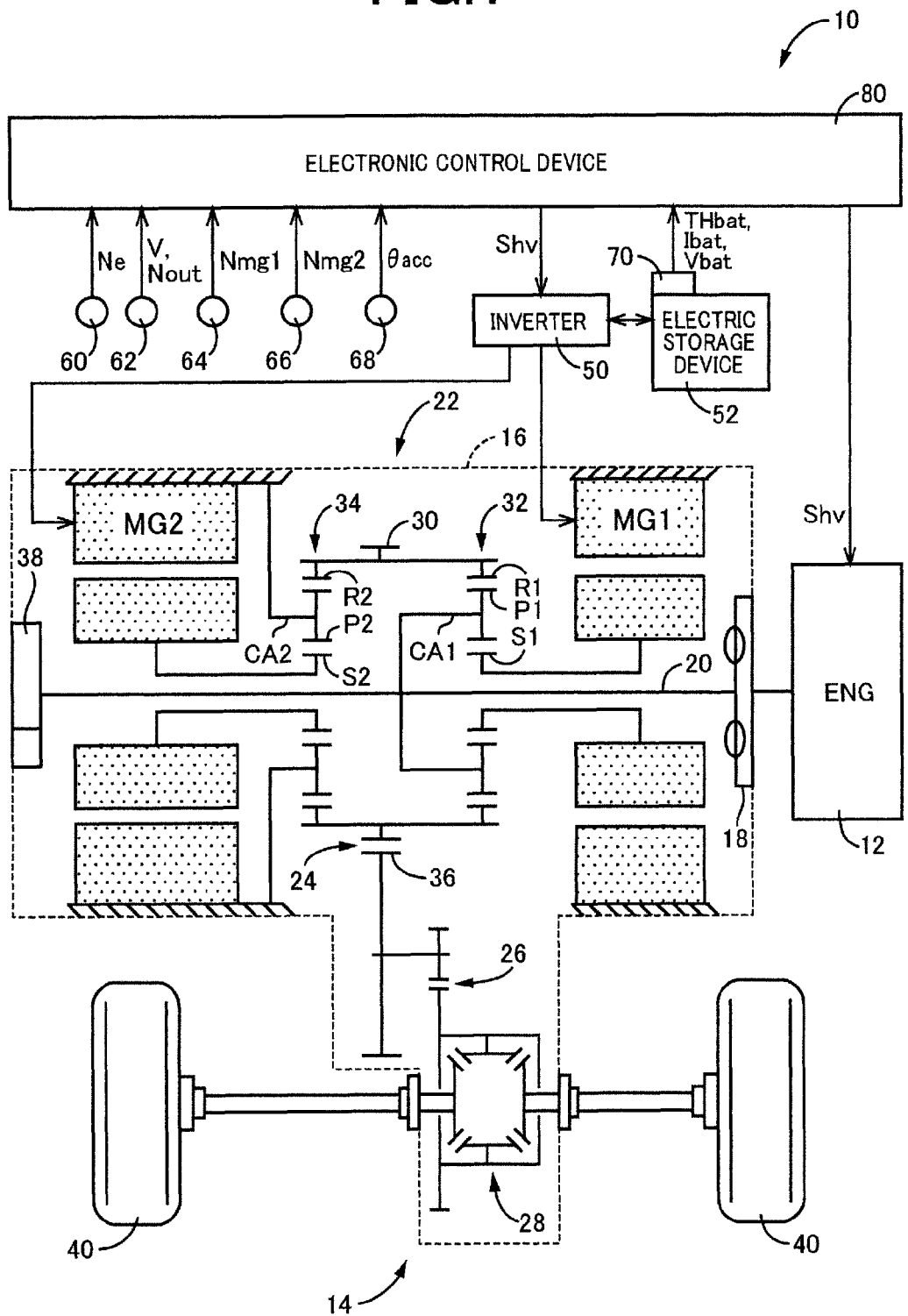
FIG. 1 is a diagram for explaining a general configuration of a hybrid vehicle to which the present invention is applied, and is a block diagram for explaining a main portion of a control system disposed on the vehicle.

FIG. 1 is a diagram for explaining a general configuration of a hybrid vehicle 10 (hereinafter referred to as a vehicle 10) to which the present invention is applied, and is a block diagram for explaining a main portion of a control system disposed for controlling portions of the vehicle 10. In FIG. 1, the vehicle 10 includes an engine 12 acting as a drive force source for running and a power transmission device 14 acting as a transaxle (T/A). The power transmission device 14 includes, in a case 16 acting as a non-rotating member attached to a vehicle body, a damper 18, an input shaft 20, a transmission portion 22, a counter gear pair 24, a final gear pair 26, a differential gear device (final reduction gear) 28, etc., in order from the engine 12 side. The transmission portion 22 has a first electric motor MG1, a power distribution mechanism 32 distributing power output from the engine 12 to the first electric motor MG1 and an output gear 30, a gear mechanism 34 coupled to the output gear 30, and a second electric motor MG2 coupled via the gear mechanism 34 to the output gear 30 in a power transmittable manner. The output gear 30 is an output rotating member of the transmission portion 22 (the power distribution mechanism 32). The counter gear pair 24 is made up of the output gear 30 and a counter driven gear 36. The input shaft 20 is coupled at one end via the damper 18 to the engine 12 and is rotationally driven by the engine 12. The input shaft 20 is coupled at the other end to an oil pump 38 and the oil pump 38 is rotationally driven by rotationally driving the input shaft 20, thereby supplying lubrication oil to portions of the power transmission device 14, for example, the power distribution mechanism 32, the gear mechanism 34, and ball bearings not depicted. In this power transmission device 14, the power of the engine 12 input via the damper 18 and the input shaft 20 and power of the second electric motor MG2 are transmitted to the output gear 30 and are transmitted from the output gear 30 sequentially via the counter gear pair 24, the final gear pair 26, the differential gear device 28, a pair of axles, etc., to a pair of drive wheels 40.

The power distribution mechanism 32 is a known single pinion type planetary gear device including, as rotating elements (rotating members), a first sun gear S1, a first carrier CA1 supporting a first pinion gear P1 in a rotatable and revolvable manner, and a first ring gear R1 meshed via the first pinion gear P1 with the first sun gear S1, and acts as a differential mechanism generating a differential action. In this power distribution mechanism 32, the first carrier CA1 acting as a first rotating element RE1 is coupled to the input shaft 20, i.e., the engine 12; the first sun gear S1 acting as a second rotating element RE2 is coupled to the first electric motor MG1; and the first ring gear R1 acting as a third rotating element RE3 is coupled to the output gear 30. As a result, since the first sun gear S1, the first carrier CA1, and the first ring gear R1 are made rotatable relative to each other, output of the engine 12 is distributed in the transmission portion 22 to the first electric motor MG1 and the output gear 30 while the first electric motor MG1 generates electricity from the power of the engine 12 distributed to the first electric motor MG1, and the generated electric energy is accumulated via an inverter 50 into an electric storage device 52, or the second electric motor MG2 is rotationally driven by the electric energy. Therefore, the transmission portion 22 is put into, for example, a continuously variable transmission state (electric CVT state) to function as an electric continuously variable transmission having a shift ratio γ0 (=engine rotation speed Ne/output rotation speed Nout) continuously varied. In other words, the transmission portion 22 acts as an electric differential portion (electric continuously variable transmission) with a differential state of the power distribution mechanism 32 controlled by controlling an operating state of the first electric motor MG1 acting as a differential electric motor. This enables the transmission portion 22 to operate the engine 12 at an optimum fuel consumption point that is an operating point of the engine 12 (e.g., an operational point indicative of an operation state of the engine 12 defined by the engine rotation speed Ne and an engine torque Te; hereinafter referred to as an engine operating point) at which the best fuel consumption is achieved, for example. This kind of hybrid format is referred to as a mechanical distribution type or a split type.

The gear mechanism 34 is a known single pinion type planetary gear device including, as rotating elements, a second sun gear S2, a second carrier CA2 supporting the second pinion gear P2 in a rotatable and revolvable manner, and a second ring gear R2 meshed via the second pinion gear P2 with the second sun gear S2. In the gear mechanism 34, the second carrier CA2 is coupled to, and prevented from rotating by, the case 16 that is a non-rotating member; the second sun gear S2 is coupled to the second electric motor MG2; and the second ring gear R2 is coupled to the output gear 30. For example, the gear mechanism 34 has a gear ratio of the planetary gear device itself (gear ratio=the number of teeth of the sun gear S2/the number of teeth of the ring gear R2) configured to function as a speed reducer and, during power running while the second electric motor MG2 outputs a torque, rotation of the second electric motor MG2 is reduced and transmitted to the output gear 30 and the torque is increased and transmitted to the output gear 30. The output gear 30 is a compound gear having functions as the ring gear R1 of the power distribution mechanism 32 and the ring gear R2 of the gear mechanism 34 and a function of a counter drive gear meshed with the counter driven gear 36 to make up the counter gear pair 24 integrated into one gear.

The first electric motor MG1 and the second electric motor MG2 are, for example, synchronous electric motors having at least one of a function as a motor generating mechanical power from electric energy and a function as an electric generator generating electric energy from mechanical power and preferably are motor generators selectively operated as a motor or an electric generator. For example, the first electric motor MG1 has a generator (electric generation) function for accepting a reaction force of the engine 12 and a motor (electric motor) function of rotationally driving the engine 12 during suspension of operation. The second electric motor MG2 has an electric motor function for acting as an electric motor for running that outputs a drive force as a drive force source for running and an electric generation function of generating electric energy through regeneration from a reverse drive force from the drive wheels 40 side.

The vehicle 10 includes an electronic control device 80 as a control device of the vehicle 10 controlling the portions of the vehicle 10 such as the transmission portion 22, for example. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides vehicle control such as hybrid drive control related to the engine 12, the first electric motor MG1, and the second electric motor MG2 and is configured separately for output control of the engine 12 and output control of the electric motors MG1 and MG2 as needed. The electronic control device 80 is supplied with each of various signals (e.g., the engine rotation speed Ne that is the rotation speed of the engine 12, the output rotation speed Nout that is the rotation speed of the output gear 30 corresponding to a vehicle speed V, a first electric motor rotation speed Nmg1, a second electric motor rotation speed Nmg2, an accelerator opening degree eacc, and a battery temperature THbat, a battery charging/discharging current Ibat, and a battery voltage Vbat of the electric storage device 52) detected by various sensors (e.g., various rotation speed sensors 60, 62, 64, 66, an accelerator opening degree sensor 68, and a battery sensor 70) disposed on the vehicle 10. The electronic control device 80 supplies various output signals (e.g., hybrid control command signals Shv such as an engine control command signal and an electric motor control command signal (shift control command signal)) to devices (e.g., the engine 12 and the inverter 50) disposed on the vehicle 10. The electronic control device 80 sequentially calculates a state of charge (charging capacity) SOC of the electric storage device 52 based on the battery temperature THbat, the battery charging/discharging current Ibat, and the battery voltage Vbat, for example.

Figure 2:
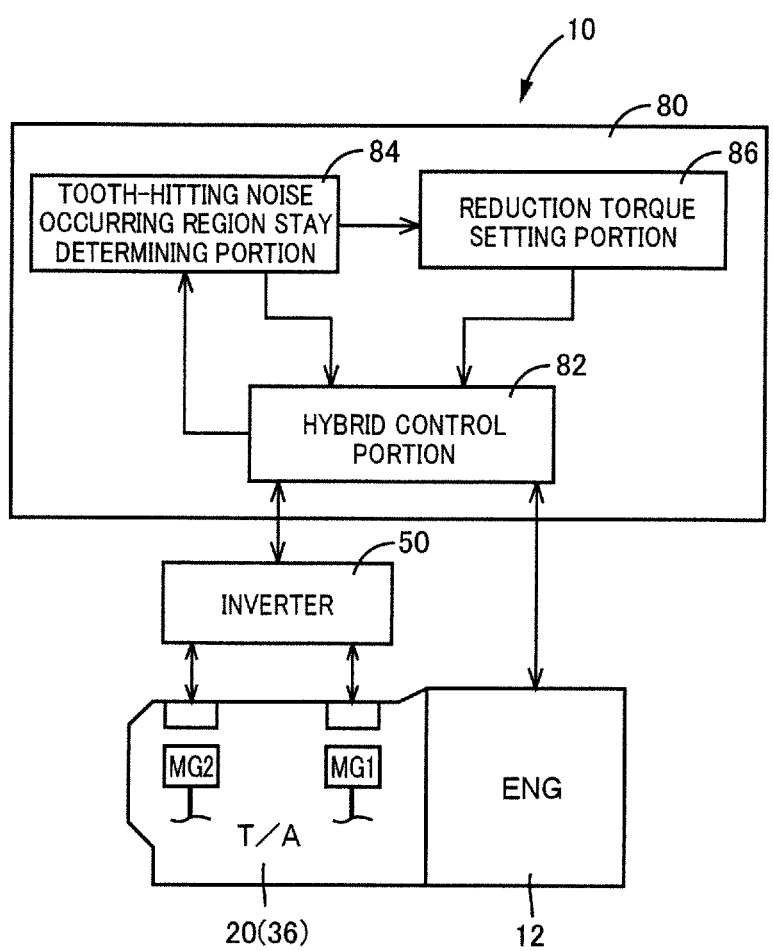
FIG. 2 is a function block diagram for explaining a main portion of the control function of the electronic control device.

FIG. 2 is a function block diagram for explaining a main portion of the control function of the electronic control device 80. In FIG. 2, the electronic control device 80 functionally includes a hybrid control means, i.e., a hybrid control portion 82.

The hybrid control portion 82 calculates a request drive torque Touttgt as a drive request amount (i.e. a driver request amount) to the vehicle 10 from a driver based on the accelerator opening degree θacc and the vehicle speed V, for example, and outputs the hybrid control command signal Shv controlling the drive force source (the engine 12 and the second electric motor MG2) so as to acquire the request drive torque Touttgt in consideration of a charging request value etc. of the electric storage device 52. For example, the hybrid control portion 82 selectively establishes, depending on a running state, a motor running mode for performing motor running (EV running) using only the second electric motor MG2 as the drive force source for running with the operation of the engine 12 stopped, an engine running mode (steady running mode) for performing engine running in which at least the engine 12 is used as the drive force source for running by accepting a reaction force against the power of the engine 12 with generation of the first electric motor MG1 to transmit a direct torque of the engine 12 to the output gear 30 (the drive wheels 40) while the second electric motor MG2 is driven by the generated electric power of the first electric motor MG1 to transmit a torque to the output gear 30, and an assist running mode (acceleration running mode) for running by further adding the power of the second electric motor MG2 using electric power from the electric storage device 52 in the engine running mode. The drive request amount can be implemented by using not only the request drive torque Touttgt [Nm] at the drive wheels 40 but also a request drive force [N] at the drive wheels 40, a request drive power [W] at the drive wheels 40, a request output torque at the output gear 30, a target toque of the drive force source, etc. The drive request amount can be implemented by simply using the accelerator opening degree θacc [%], a throttle valve opening degree [%], an intake air amount [g/sec] of the engine 12, etc.

If a vehicle state represented by the actual vehicle speed V and the drive request amount (such as the accelerator opening degree eacc and the request drive torque Touttgt) is within a motor running region obtained and stored empirically or in design in advance (i.e., predefined), the hybrid control portion 82 establishes the motor running mode. On the other hand, if the vehicle state is within a predefined engine running region, the hybrid control portion 82 establishes the engine running mode or the assist running mode. The motor running region is set in a lower output region than the engine running region. Even when the vehicle state is within the motor running region, if the EV running cannot be performed because discharge is limited based on, for example, the charging capacity SOC of the electric storage device 52 and/or dischargeable electric power (power)) corresponding to an electric storage device temperature, i.e., based on an output limitation Wout, if charging of the electric storage device 52 is requested, or if the engine 12 and equipment related to the engine 12 must be warmed up, the hybrid control portion 82 operates the engine 12 for running.

During the EV running, the hybrid control portion 82 determines whether start of the engine 12 is requested, based on an increase in the vehicle speed V or the drive request amount, insufficient charging of the electric storage device 52, or a warm-up request for the engine 12. If it is determined that the start of the engine 12 is requested, the hybrid control portion 82 provides engine start control of starting the engine 12. In the engine start control, the hybrid control portion 82 rotationally drives (cranks) the engine 12 with power of the first electric motor MG1 to increase the engine rotation speed Ne, thereby starting the engine 12. In particular, the hybrid control portion 82 causes the first electric motor MG1 to output an output torque of the first electric motor MG1 (hereinafter referred to as an MG1 torque Tmg1) as a cranking torque for raising the engine rotation speed Ne through an increase in the first electric motor rotation speed Nmg1. When the engine rotation speed Ne is increased to be equal to or greater than a predetermined engine rotation speed enabling self-sustaining operation or complete explosion of the engine 12, the hybrid control portion 82 injects fuel into the engine 12 and ignites the engine 12 to start the engine 12.

During the engine running, the hybrid control portion 82 determines whether stop of the engine 12 is requested, based on a decrease in the vehicle speed V or the drive request amount, or completion of charging of the electric storage device 52 or completion of warm-up of the engine 12 etc., when the vehicle state is within the motor running region. If it is determined that the stop of the engine 12 is requested, the hybrid control portion 82 provides engine stop control of stopping the operation of the engine 12. In the engine stop control, the hybrid control portion 82 stops the operation of the engine 12 through fuel cut etc., and additionally causes a negative torque to act on the engine 12 from the power (negative torque) of the first electric motor MG1 so as to reduce the engine rotation speed Ne, thereby stopping the rotation of the engine 12. In particular, instead of stopping the operation of engine 12 to allow the engine rotation speed Ne to decrease in a passive manner, the hybrid control portion 82 causes the first electric motor MG1 to output the MG1 torque Tmg1 as a reduction torque for forcibly reducing the engine rotation speed Ne through a decrease in the first electric motor rotation speed Nmg1. Therefore, when stopping the rotation of the engine 12, the hybrid control portion 82 causes the first electric motor MG1 to apply an engine reduction torque Tmg1dn for reducing the engine rotation speed Ne.

In the engine stop control, the engine rotation speed Ne is forcibly reduced for the purpose of quickly passing through a resonance rotation speed range on the side lower than idling rotation speed of the engine 12, for example. Such forcible reduction of the engine rotation speed Ne is desirably performed without giving an engine stop shock, an uncomfortable feeling, etc. to a driver as far as possible. Therefore, the engine reduction torque Tmg1dn is implemented as a predetermined engine reduction torque Tmg1dnp that is an adapted value predefined such that when the engine rotation speed Ne is reduced by the first electric motor MG1, a gradient of variation is set to an optimum gradient of variation for making it hard to give an engine stop shock, an uncomfortable feeling, etc. to a driver.

Figure 3:
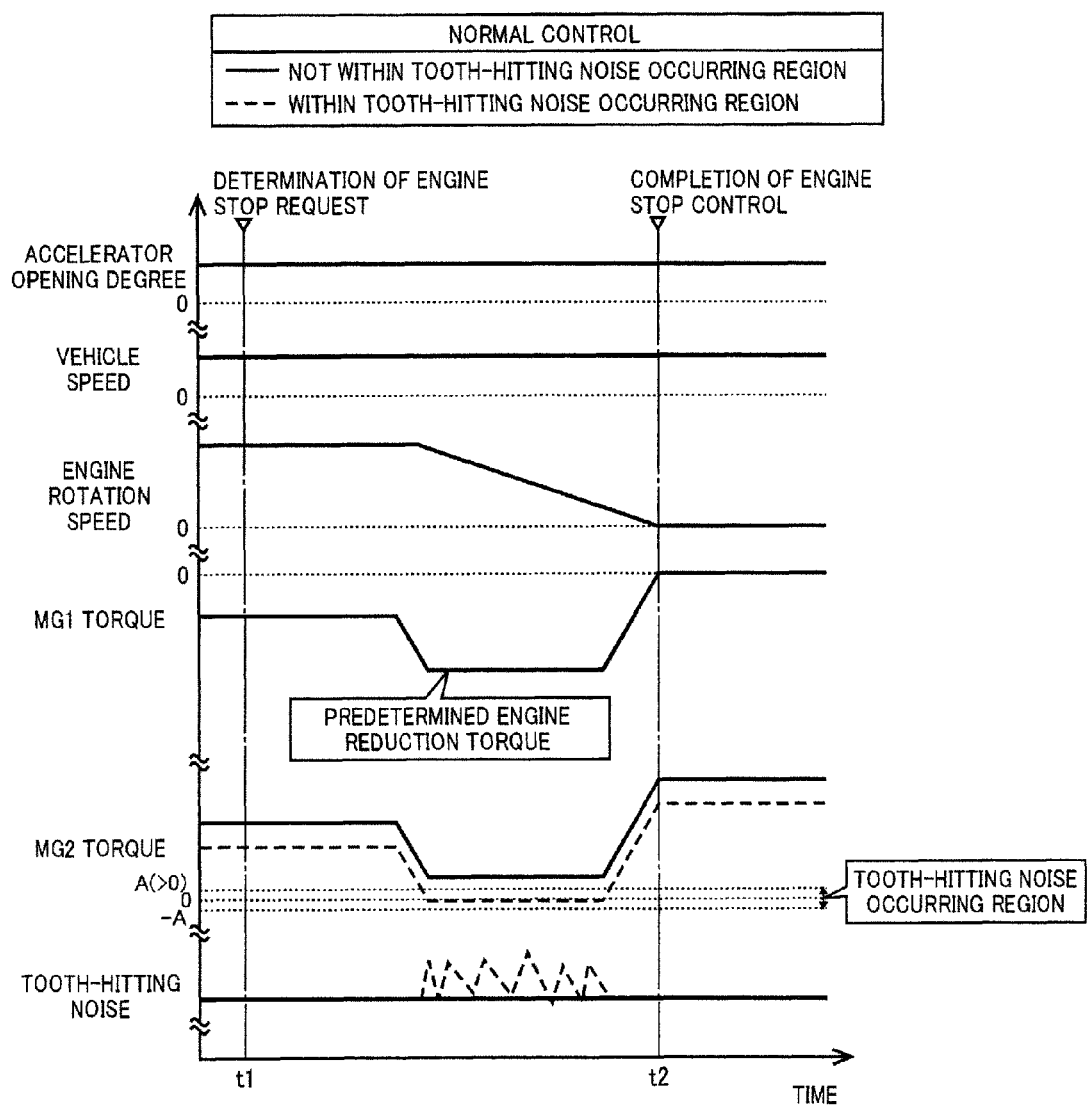
FIG. 3 is a time chart of an example when the engine stop control is provided as normal control in which the engine rotation speed is reduced by the predetermined engine reduction torque.

FIG. 3 is a time chart of an example when the engine stop control is provided as normal control in which the engine rotation speed Ne is reduced by the predetermined engine reduction torque Tmg1dnp. In FIG. 3, for example, if it is determined that the stop of the engine 12 is requested because of completion of charging during the engine running (time t1), the engine stop control is provided by stopping the operation of the engine 12 through fuel cut etc., and additionally causing the first electric motor MG1 to output the predetermined engine reduction torque Tmg1dnp so as to forcibly reduce the engine rotation speed Ne. When the rotation of the engine 12 is substantially stopped, the engine stop control is terminated (time t2).

When the second electric motor MG2 is in a no-load state or in a state close to the no-load state (i.e., when the output torque of the second electric motor MG2 (hereinafter referred to as an MG2 torque Tmg2) is in a predetermined torque range including a value of zero [Nm], i.e., in a predetermined torque range of zero or near zero) in the power transmission device 14, since mutual pressing force of gears meshed with each other is weak in the gear mechanism 34 coupled to the second electric motor MG2, for example, and the gears are in a gear floating state, so-called rattling noise easily occurs. In this embodiment, such a predetermined torque range of the MG2 torque Tmg2 facilitating the occurrence of such a tooth-hitting noise is referred to as a rattling noise occurrence region (tooth-hitting noise occurring region) G. This tooth-hitting noise occurring region G is, for example, a torque region predefined as a range of the MG2 torque Tmg2 facilitating the occurrence of the tooth-hitting noise in the transmission portion 22 (e.g., in a meshing portion of gears meshed with each other in the transmission portion 22 (particularly, a meshing portion of gears meshed with each other in the gear mechanism 34)), and is defined as a region (torque range) between a negative-side tooth-hitting noise occurrence threshold value (−A) [Nm] that is a near-zero negative threshold value and a positive-side tooth-hitting noise occurrence threshold value (A) [Nm] that is a near-zero positive threshold value across the value of 0 [Nm] of the MG2 torque Tmg2 (where A>0). From another viewpoint, the tooth-hitting noise occurring region G corresponds to a floating state of the second electric motor MG2 when the MG2 torque Tmg2 is zero or near zero, for example. Therefore, a torque value of zero or near zero is a torque value predefined as a value of the MG2 torque Tmg2 facilitating the occurrence of the tooth-hitting noise in the transmission portion 22.

On the other hand, during transition to stopping the rotation of the engine 12 through the engine stop control described above, the direct torque (positive torque) associated with output of the predetermined engine reduction torque Tmg1dnp is transmitted onto the output gear 30. Therefore, as depicted in FIG. 3, the hybrid control portion 82 changes (varies) the MG2 torque Tmg2 so as to satisfy (realize) the drive request amount (e.g., the request drive torque Touttgt). Therefore, during transition to stopping the rotation of the engine 12 by using the predetermined engine reduction torque Tmg1dnp, the MG2 torque Tmg2 may not be in the tooth-hitting noise occurring region G as indicated by a solid line in some cases, while the MG2 torque Tmg2 may be in the tooth-hitting noise occurring region G as indicated by a broken line in other cases, depending on a difference in the drive request amount.

Therefore, when the MG2 torque Tmg2 is in the tooth-hitting noise occurring region G so as to realize the drive request amount during transition to stopping the rotation of the engine 12 if the engine reduction torque Tmg1dn applied by the first electric motor MG1 is set to the predetermined engine reduction torque Tmg1dnp at the time of stopping the rotation of the engine 12 through the engine stop control described above, the electronic control device 80 changes the engine reduction torque Tmg1dn from the predetermined engine reduction torque Tmg1dnp such that the MG2 torque Tmg2 is out of the tooth-hitting noise occurring region G during transition to stopping the rotation of the engine 12. The electronic control device 80 determines (predicts) whether the MG2 torque Tmg2 is in the tooth-hitting noise occurring region G during transition to stopping the rotation of the engine 12, when it is determined that a stop of the engine is requested, for example. Therefore, the electronic control device 80 further functionally includes a tooth-hitting noise occurring region stay determining means, i.e., a tooth-hitting noise occurring region stay determining portion 84, and a reduction torque setting means, i.e., a reduction torque setting portion 86.

If the hybrid control portion 82 determines that a stop of the engine 12 is requested, the tooth-hitting noise occurring region stay determining portion 84 determines whether the MG2 torque Tmg2 is in the tooth-hitting noise occurring region G during transition to stopping the rotation of the engine 12 if the engine reduction torque Tmg1dn is set to the predetermined engine reduction torque Tmg1dnp in the engine stop control by the hybrid control portion 82. For example, when the hybrid control portion 82 determines that a stop of the engine 12 is requested, the tooth-hitting noise occurring region stay determining portion 84 subtracts a predetermined direct torque transmitted onto the output gear 30 due to the output of the predetermined engine reduction torque Tmg1dnp (i.e., a predetermined direct torque calculated from Tmg1dnp, the gear ratio of the power distribution mechanism 32, etc.) from the MG2 torque Tmg2 at this time point. The tooth-hitting noise occurring region stay determining portion 84 then determines whether a value of the MG2 torque Tmg2 after the subtraction is within the tooth-hitting noise occurring region G, for example, whether an absolute value of the MG2 torque Tmg2 after the subtraction (|Tmg2 after subtraction|) is equal to or less than the tooth-hitting noise occurrence threshold value (A) (where A>0).

If the tooth-hitting noise occurring region stay determining portion 84 determines that the MG2 torque Tmg2 is not in the tooth-hitting noise occurring region G, the reduction torque setting portion 86 sets the engine reduction torque Tmg1dn to the predetermined engine reduction torque Tmg1dnp. On the other hand, if the tooth-hitting noise occurring region stay determining portion 84 determines that the MG2 torque Tmg2 enters the tooth-hitting noise occurring region G, the reduction torque setting portion 86 sets the engine reduction torque Tmg1dn to a value changed by a predetermined change torque from the predetermined engine reduction torque Tmg1dnp such that the MG2 torque Tmg2 is out of the tooth-hitting noise occurring region G during transition to stopping the rotation of the engine 12.

If the engine reduction torque Tmg1dn is changed from the predetermined engine reduction torque Tmg1dnp, a change width from the predetermined engine reduction torque Tmg1dnp is preferably smaller. Specifically, if the engine reduction torque Tmg1dn varies, since a lowering gradient of the engine rotation speed Ne varies as a trade-off (in other words, since a time required for stopping the engine varies), an engine stop shock and an uncomfortable feeling may vary (deteriorate) as compared to when the predetermined engine reduction torque Tmg1dnp is used that is the value adapted to make it hard to give the engine stop shock, the uncomfortable feeling, etc. to a driver. Therefore, for example, whether such variation is within an acceptable range must preliminarily be confirmed through adaptation, evaluation, etc. It is considered that if a change width from the predetermined engine reduction torque Tmg1dnp is larger, the engine stop shock and the uncomfortable feeling largely vary, resulting in increases in workload for adaptation and workload for evaluation. Because of these facts, a change width from the predetermined engine reduction torque Tmg1dnp is preferably smaller. On the other hand, if the engine reduction torque Tmg1dn decreases, the direct torque (positive torque) transmitted onto the output gear 30 also decreases and, thus, the MG2 torque Tmg2 is changed toward the increasing side and, if the engine reduction torque Tmg1dn increases, the direct torque (positive torque) transmitted onto the output gear 30 also increases and, thus, the MG2 torque Tmg2 is changed toward the decreasing side.

Therefore, when the MG2 torque Tmg2 is in the tooth-hitting noise occurring region G during transition to stopping the rotation of the engine 12, the reduction torque setting portion 86 changes the engine reduction torque Tmg1dn to be smaller than the predetermined engine reduction torque Tmg1dnp if the MG2 torque Tmg2 is closer to the positive-side tooth-hitting noise occurrence threshold value (A), and changes the engine reduction torque Tmg1dn to be larger than the predetermined engine reduction torque Tmg1dnp if the MG2 torque Tmg2 is closer to the negative-side tooth-hitting noise occurrence threshold value (−A). The tooth-hitting noise occurring region stay determining portion 84 determines whether the value of the MG2 torque Tmg2 after the subtraction is closer to the positive-side tooth-hitting noise occurrence threshold value (A) or the negative-side tooth-hitting noise occurrence threshold value (−A), based on a difference from each of the threshold values, for example.

Figure 4:
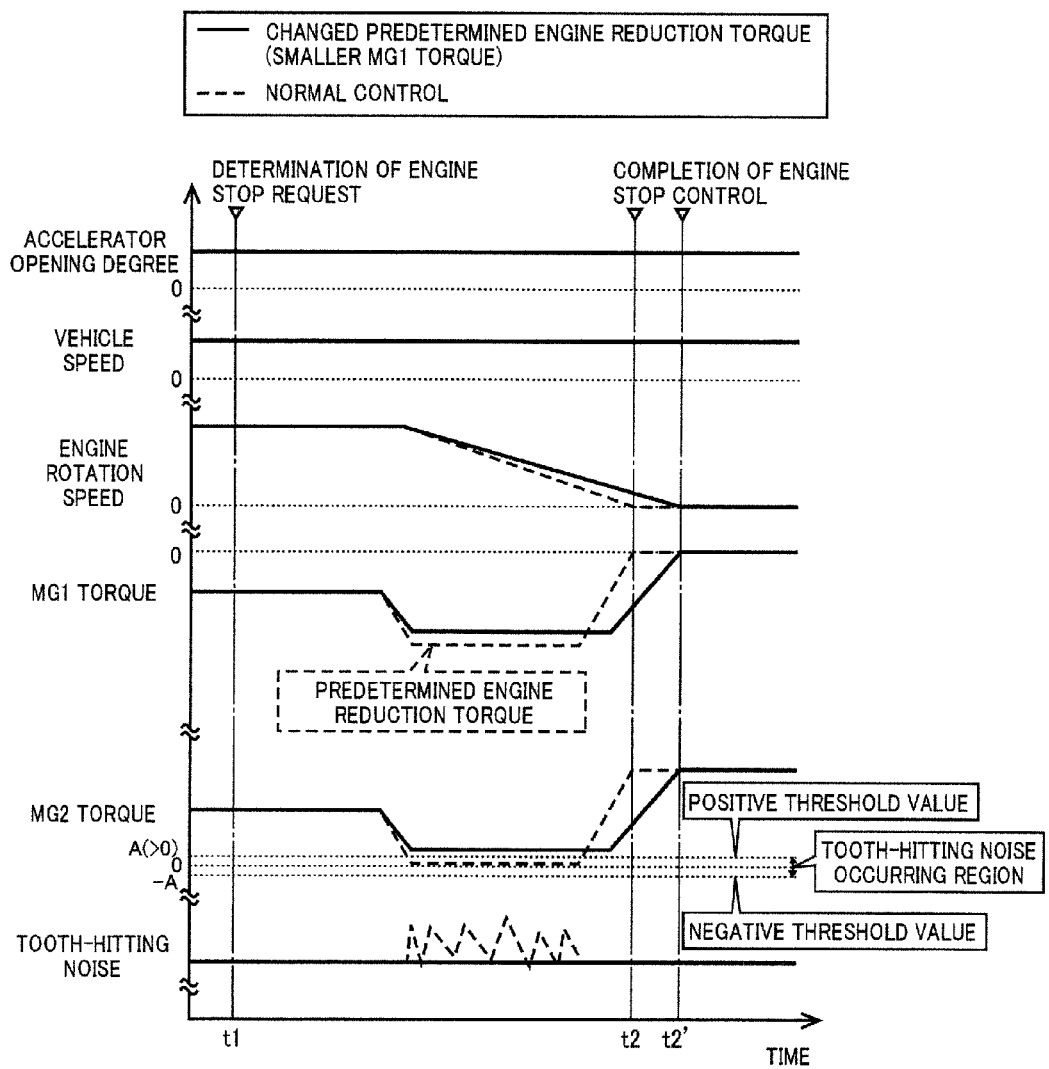
FIG. 4 is a time chart of an example when the engine reduction torque is changed from the predetermined engine reduction torque in the engine stop control and depicts an example when the engine reduction torque is changed to make it smaller.
Figure 5:
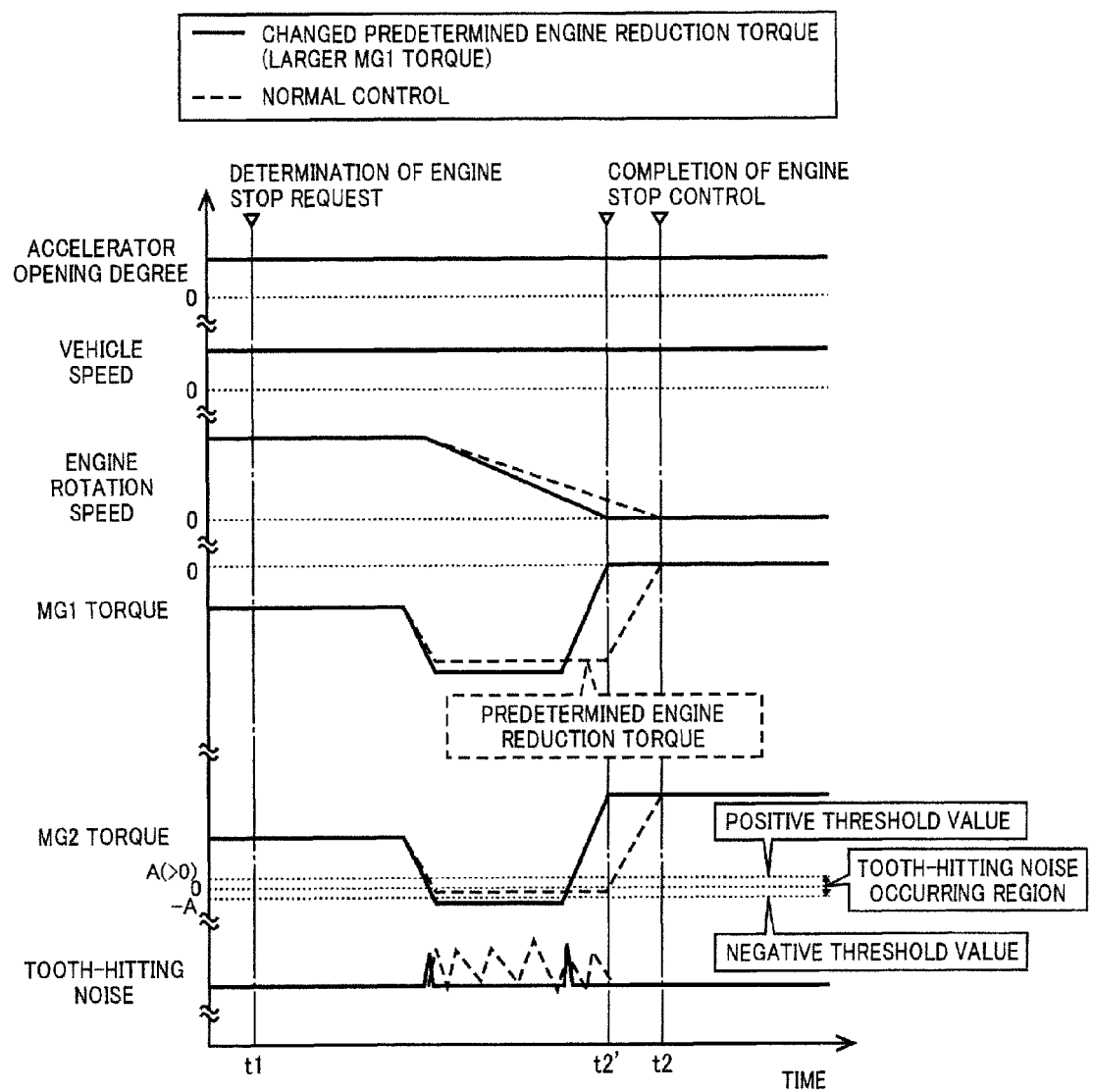
FIG. 5 is a time chart of an example when the engine reduction torque is changed from the predetermined engine reduction torque in the engine stop control and depicts an example when the engine reduction torque is changed to make it larger.

Each of FIGS. 4 and 5 is a time chart of an example when the engine reduction torque Tmg1dn is changed from the predetermined engine reduction torque Tmg1dnp in the engine stop control. FIG. 4 depicts an example when the engine reduction torque Tmg1dn is changed to make the negative torque of the MG1 torque Tmg1 smaller (i.e., to decrease the predetermined engine reduction torque Tmg1dnp) and FIG. 5 depicts an example when the engine reduction torque Tmg1dn is changed to make the negative torque of the MG1 torque Tmg1 larger (i.e., to increase the predetermined engine reduction torque Tmg1dnp).

In FIG. 4, for example, when it is determined that a stop of the engine 12 is requested (time t1), if it is determined that the MG2 torque Tmg2 is in the tooth-hitting noise occurring region G during transition to stopping the rotation of the engine 12 due to provision of the engine stop control through the normal control in which the engine rotation speed Ne is reduced by the predetermined engine reduction torque Tmg1dnp as indicated by a broken line, and if it is determined that the MG2 torque Tmg2 being in the tooth-hitting noise occurring region G comes closer to the positive-side tooth-hitting noise occurrence threshold value (A), the engine reduction torque Tmg1dn changed to decrease the predetermined engine reduction torque Tmg1dnp is used in the engine stop control as indicated by a solid line, and the MG2 torque Tmg2 is set out of the tooth-hitting noise occurring region G across the closer positive-side tooth-hitting noise occurrence threshold value (A). Therefore, as compared to when the engine reduction torque Tmg1dn changed to increase the predetermined engine reduction torque Tmg1dnp is used for setting the MG2 torque Tmg2 out of the tooth-hitting noise occurring region G across the further negative-side tooth-hitting noise occurrence threshold value (−A), the change width from the predetermined engine reduction torque Tmg1dnp is made smaller. If the engine reduction torque Tmg1dn is changed to be smaller than the predetermined engine reduction torque Tmg1dnp, the lowering gradient of the engine rotation speed Ne is made relatively slower and a time to complete the engine stop control is elongated.

In FIG. 5, for example, when it is determined that a stop of the engine 12 is requested (time t1), if it is determined that the MG2 torque Tmg2 is in the tooth-hitting noise occurring region G during transition to stopping the rotation of the engine 12 due to provision of the engine stop control through the normal control in which the engine rotation speed Ne is reduced by the predetermined engine reduction torque Tmg1dnp as indicated by a broken line, and if it is determined that the MG2 torque Tmg2 being in the tooth-hitting noise occurring region G comes closer to the negative-side tooth-hitting noise occurrence threshold value (−A), the engine reduction torque Tmg1dn changed to increase the predetermined engine reduction torque Tmg1dnp is used in the engine stop control as indicated by a solid line, and the MG2 torque Tmg2 is set out of the tooth-hitting noise occurring region G across the closer negative-side tooth-hitting noise occurrence threshold value (−A). Therefore, as compared to when the engine reduction torque Tmg1dn changed to decrease the predetermined engine reduction torque Tmg1dnp is used for setting the MG2 torque Tmg2 out of the tooth-hitting noise occurring region G across the further positive-side tooth-hitting noise occurrence threshold value (A), the change width from the predetermined engine reduction torque Tmg1dnp is made smaller. If the engine reduction torque Tmg1dn is changed to be larger than the predetermined engine reduction torque Tmg1dnp, the lowering gradient of the engine rotation speed Ne is relatively faster and the time to complete the engine stop control is shortened. In the example of FIG. 5, since the MG2 torque Tmg2 is a positive value when it is determined that the stop of the engine 12 is requested, even if the predetermined engine reduction torque Tmg1dnp is changed, the MG2 torque Tmg2 is not entirely out of the tooth-hitting noise occurring region G.

After the engine stop control is started, a driver may perform an accelerator operation while the control is being provided. Therefore, during the engine stop control, regardless of whether the predetermined engine reduction torque Tmg1dnp is used, the MG2 torque Tmg2 may be varied in the direction toward the tooth-hitting noise occurring region G in accordance with variation in the drive request amount (e.g., the request drive torque Touttgt) due to the accelerator operation (i.e., variation in the accelerator opening degree θacc). Therefore, even if the engine reduction torque Tmg1dn is set such that the MG2 torque Tmg2 is out of the tooth-hitting noise occurring region G during transition at the time of stopping the rotation of the engine 12 when it is determined that the stop of the engine 12 is requested, the MG2 torque Tmg2 may be varied in the direction toward the tooth-hitting noise occurring region G due to the accelerator operation during provision of the engine stop control.

Therefore, the hybrid control portion 82 determines whether an accelerator operation is performed during provision of the engine stop control based on a change in the accelerator opening degree θacc, for example, and if it is determined that an accelerator operation is performed, the hybrid control portion 82 makes variation of the drive request amount corresponding to the accelerator operation slower during transition to stopping the rotation of the engine 12 as compared to when it is not during the transition.

For example, during transition to stopping the rotation of the engine 12, the hybrid control portion 82 uses a predetermined method (e.g., a filter process or a first-order lag) to moderate variation in value of the accelerator opening degree θacc used for calculation of the request drive torque Touttgt relative to variation in detection value of the accelerator opening degree sensor 68. Alternatively, the hybrid control portion 82 uses a predetermined method to moderate variation in the request drive torque Touttgt calculated based on the accelerator opening degree θacc and the vehicle speed V. This is performed from the viewpoint that, even in the case of the accelerator operation causing the MG2 torque Tmg2 to vary in the direction toward the tooth-hitting noise occurring region G, if variation of the drive request amount is slow, a state of the MG2 torque Tmg2 out of the tooth-hitting noise occurring region G can be maintained as long as possible.

Instead of or in addition to making the variation of the drive request amount corresponding to the accelerator operation slower as described above, if the drive request amount is varied such that the MG2 torque Tmg2 varies in the direction toward the tooth-hitting noise occurring region G during transition to stopping the rotation of the engine 12, the reduction torque setting portion 86 changes the engine reduction torque Tmg1dn being applied by the first electric motor MG1 such that the MG2 torque Tmg2 varies in the direction away from the tooth-hitting noise occurring region G. Therefore, when the hybrid control portion 82 determines that an accelerator operation is performed, if the tooth-hitting noise occurring region stay determining portion 84 determines that the MG2 torque Tmg2 is varied in the direction toward the tooth-hitting noise occurring region G, the reduction torque setting portion 86 changes the engine reduction torque Tmg1dn being applied by the first electric motor MG1 such that the MG2 torque Tmg2 varies in the direction away from the tooth-hitting noise occurring region G. For example, when the engine reduction torque Tmg1dn is being applied by the first electric motor MG1 such that the MG2 torque Tmg2 is out of the tooth-hitting noise occurring region G on the positive value side as indicated by the solid lines of FIGS. 3 and 4, if the drive request amount is varied such that the MG2 torque Tmg2 varies in the direction toward the tooth-hitting noise occurring region G, the reduction torque setting portion 86 changes and decreases the engine reduction torque Tmg1dn being applied. Alternatively, when the engine reduction torque Tmg1dn is being applied by the first electric motor MG1 such that the MG2 torque Tmg2 is out of the tooth-hitting noise occurring region G on the negative value side as indicated by the solid line of FIG. 5, if the drive request amount is varied such that the MG2 torque Tmg2 varies in the direction toward the tooth-hitting noise occurring region G, the reduction torque setting portion 86 changes and increases the engine reduction torque Tmg1dn being applied.

From another viewpoint, if the engine reduction torque Tmg1dn is changed from the predetermined engine reduction torque Tmg1dnp, the reduction torque setting portion 86 may change the engine reduction torque Tmg1dn from the predetermined engine reduction torque Tmg1dnp to one of a plurality of types of changed values that are set in correspondence to each value of the predetermined engine reduction torque Tmg1dnp causing the MG2 torque Tmg2 to stay in the tooth-hitting noise occurring region G. This is performed from the viewpoint that if the changed engine reduction torque Tmg1dn has a plurality of changed values that are set in correspondence to each value of the predetermined engine reduction torque Tmg1dnp, the MG2 torque Tmg2 less frequently enters the tooth-hitting noise occurring region G when an accelerator operation is performed during provision of the engine stop control.

Figure 6:
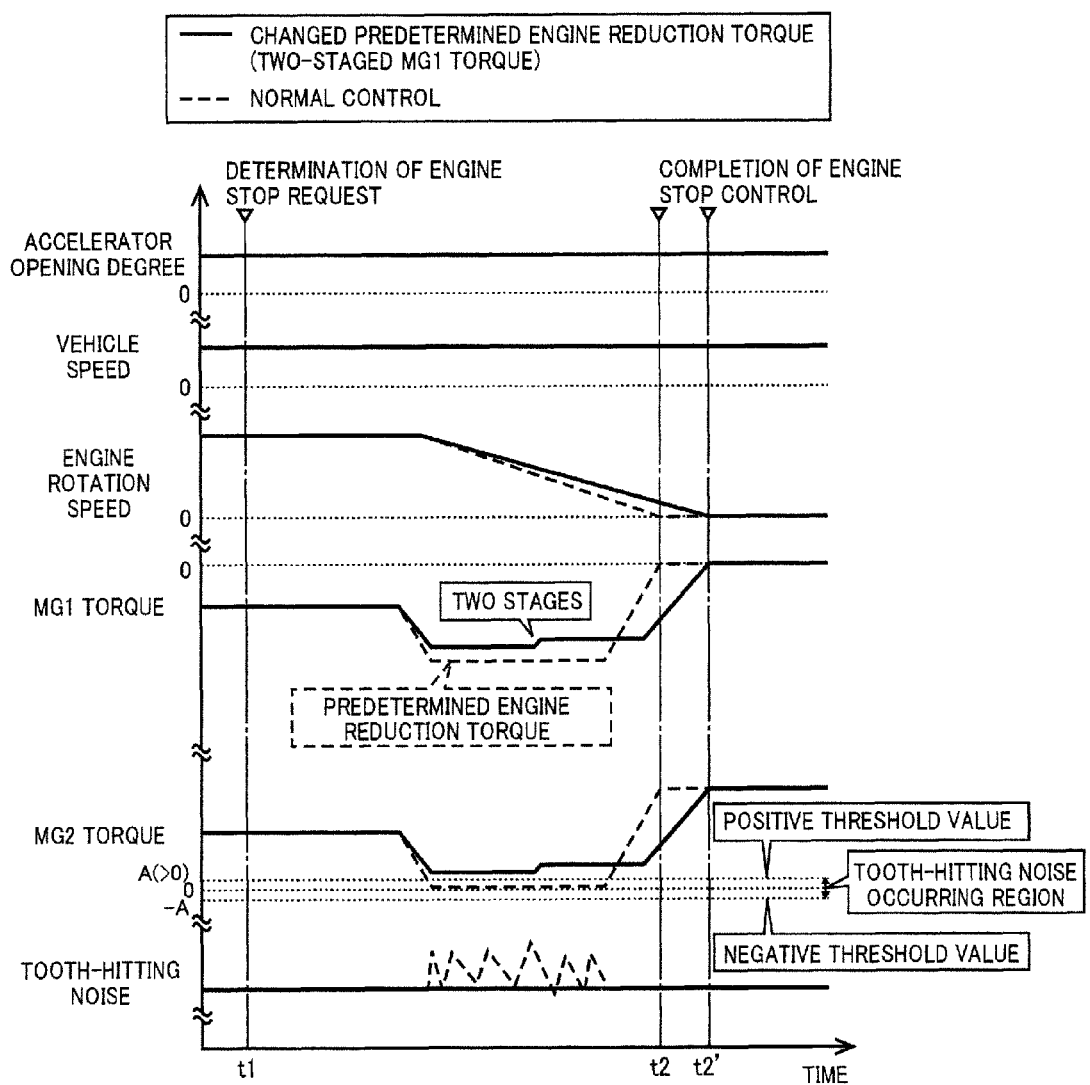
FIG. 6 is a time chart of an example when the engine reduction torque is changed to one of a plurality of types of changed values relative to the predetermined engine reduction torque.

FIG. 6 is a time chart of an example when the engine reduction torque Tmg1dn is changed to one of a plurality of types of changed values relative to the predetermined engine reduction torque Tmg1dnp. In FIG. 6, the engine reduction torque Tmg1dn is changed from the predetermined engine reduction torque Tmg1dnp to two types (two stages) of changed values that are set in correspondence to each value of the predetermined engine reduction torque Tmg1dnp causing the MG2 torque Tmg2 to stay in the tooth-hitting noise occurring region G as indicated by a broken line. As a result, the changed engine reduction torque Tmg1dn is restrained from wholly being in the tooth-hitting noise occurring region G as indicated by the broken line due to an accelerator operation. The two values to be changed are predefined values. Three or more types of changed values may be predefined. Although the example of FIG. 6 is an example in the case of changing the engine reduction torque Tmg1dn to be smaller than the predetermined engine reduction torque Tmg1dnp, the engine reduction torque Tmg1dn may have a plurality of types of changed values in the same way also in the case of changing the engine reduction torque Tmg1dn to be larger than the predetermined engine reduction torque Tmg1dnp. If the engine reduction torque Tmg1dn has a plurality of types of changed values, the number of the types and a degree of difference between adjacent stages may be changed based on where the MG2 torque Tmg2 is caused to stay in the tooth-hitting noise occurring region G.

Figure 7:
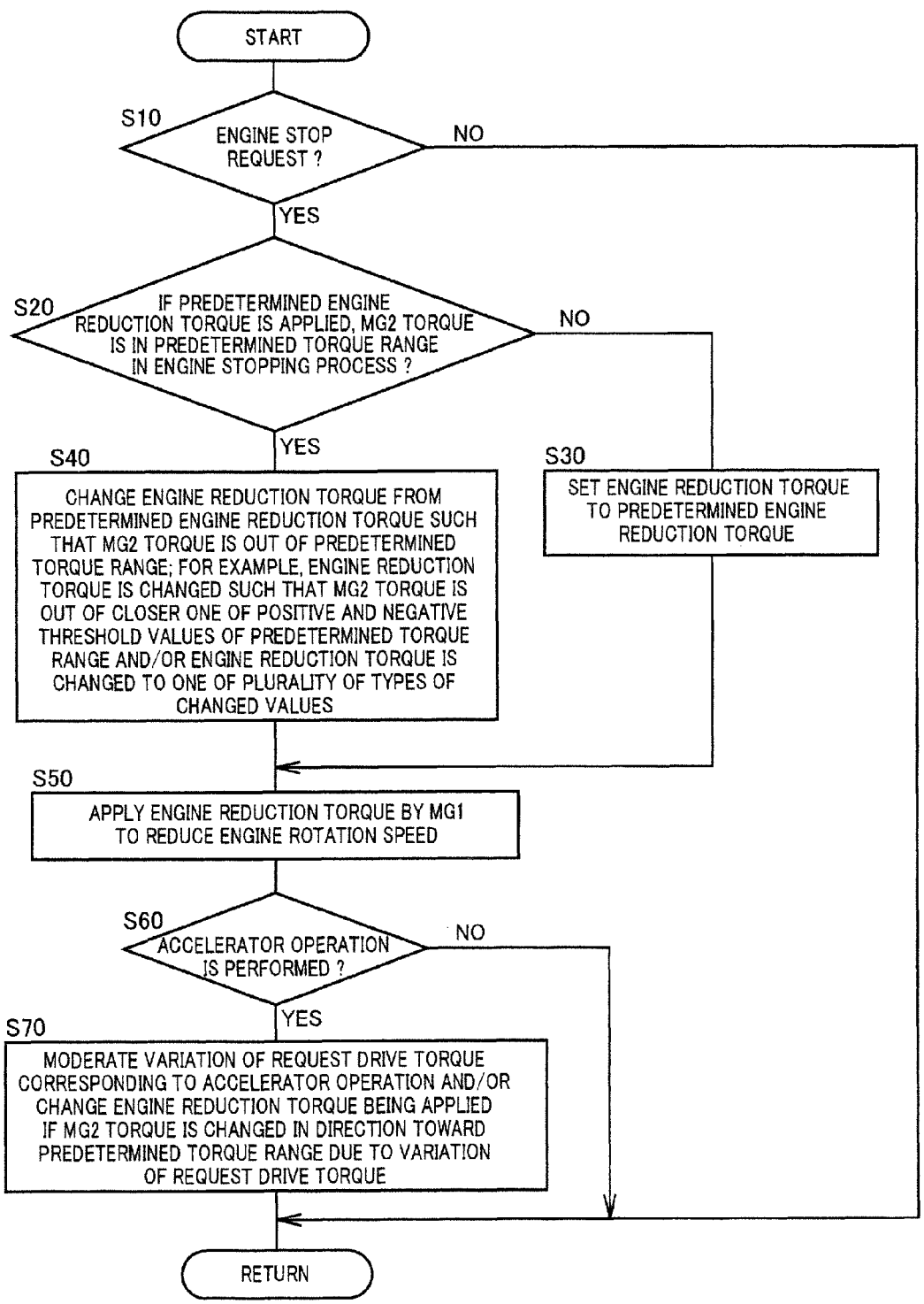
FIG. 7 is a flowchart for explaining a main portion of the control operation of the electronic control device, i.e., the control operation for suppressing or avoiding the occurrence of tooth-hitting noise while the drive request amount is realized when the engine reduction torque is applied by the first electric motor at the time of stopping the rotation of the engine.

FIG. 7 is a flowchart for explaining a main portion of the control operation of the electronic control device 80, i.e., the control operation for suppressing or avoiding the occurrence of tooth-hitting noise while the drive request amount (e.g., the request drive torque Touttgt) is realized when the engine reduction torque Tmg1dn is applied by the first electric motor MG1 at the time of stopping the rotation of the engine 12, and is repeatedly executed with an extremely short cycle time, for example, on the order of a few msec to a few tens of msec.

In FIG. 7, first, at step (hereinafter, step will be omitted) S10 corresponding to the hybrid control portion 82, it is determined whether a stop of the engine 12 is requested during the engine running, for example. If the determination of S10 is negative, this routine is terminated and, if affirmative, at S20 corresponding to the tooth-hitting noise occurring region stay determining portion 84, it is determined whether the MG2 torque Tmg2 is in the tooth-hitting noise occurring region G during transition to stopping the rotation of the engine 12 if the predetermined engine reduction torque Tmg1dnp is applied in the engine stop control, for example. If the determination of S20 is negative, at S30 corresponding to the reduction torque setting portion 86, for example, the engine reduction torque Tmg1dn is set to the predetermined engine reduction torque Tmg1dnp. If the determination of S20 is affirmative, at S40 corresponding to the reduction torque setting portion 86, the engine reduction torque Tmg1dn is changed from the predetermined engine reduction torque Tmg1dnp such that the MG2 torque Tmg2 is out of the tooth-hitting noise occurring region G during transition to stopping the rotation of the engine 12, for example. Specifically, if the MG2 torque Tmg2 is closer to the positive-side tooth-hitting noise occurrence threshold value (A), the engine reduction torque Tmg1dn is changed to be smaller than the predetermined engine reduction torque Tmg1dnp, and if the MG2 torque Tmg2 is closer to the negative-side tooth-hitting noise occurrence threshold value (−A), the engine reduction torque Tmg1dn is changed to be larger than the predetermined engine reduction torque Tmg1dnp. Alternatively or additionally, the engine reduction torque Tmg1dn is changed from the predetermined engine reduction torque Tmg1dnp to one of a plurality of types of changed values that are set in correspondence to each value of the predetermined engine reduction torque Tmg1dnp. After S30 or S40, at S50 corresponding to the hybrid control portion 82, for example, the engine stop control is provided by stopping the operation of the engine 12 through fuel cut etc., and causing the first electric motor MG1 to apply the engine reduction torque Tmg1dn so as to reduce the engine rotation speed Ne, thereby stopping the rotation of the engine 12. Subsequently, at S60 corresponding to the hybrid control portion 82, for example, it is determined whether an accelerator operation is performed. If the determination of S60 is negative, this routine is terminated and, if affirmative, at S70 corresponding to the hybrid control portion 82, the tooth-hitting noise occurring region stay determining portion 84, and the reduction torque setting portion 86, for example, variation of the drive request amount corresponding to the accelerator operation is made slower. Alternatively or additionally, if it is determined that the MG2 torque Tmg2 is varied in the direction toward the tooth-hitting noise occurring region G due to variation in the drive request amount, the engine reduction torque Tmg1dn being applied by the first electric motor MG1 is changed such that the MG2 torque Tmg2 varies in the direction away from the tooth-hitting noise occurring region G.

As described above, according to this example, when the engine rotation speed Ne is reduced by the first electric motor MG1, if the MG2 torque Tmg2 is in the tooth-hitting noise occurring region G so as to realize the drive request amount, the engine reduction torque Tmg1dn itself generated by the first electric motor MG1 is changed. The MG2 torque Tmg2 for realizing the drive request amount is accordingly changed from the torque value in the case of the engine reduction torque Tmg1dn set to the predetermined engine reduction torque Tmg1dnp and, therefore, the MG2 torque Tmg2 can be kept away from the tooth-hitting noise occurring region G. In other words, by changing the engine reduction torque Tmg1dn itself of the first electric motor MG1, the MG2 torque Tmg2 can be kept out of the tooth-hitting noise occurring region G while the drive request amount is secured. Therefore, if the engine reduction torque Tmg1dn is applied by the first electric motor MG1 when the rotation of the engine 12 is stopped, the occurrence of the tooth-hitting noise can be suppressed or avoided while the drive request amount is realized.

According to this example, when the MG2 torque Tmg2 is in the tooth-hitting noise occurring region G during transition to stopping the rotation of the engine 12, if the MG2 torque Tmg2 is closer to the positive-side tooth-hitting noise occurrence threshold value (A), the engine reduction torque Tmg1dn is changed to be smaller than the predetermined engine reduction torque Tmg1dnp, and if the MG2 torque Tmg2 is closer to the negative-side tooth-hitting noise occurrence threshold value (−A), the engine reduction torque Tmg1dn is changed to be larger than the predetermined engine reduction torque Tmg1dnp and, therefore, if the engine reduction torque Tmg1dn is changed from the predetermined engine reduction torque Tmg1dnp, the change width can be made smaller. As a result, when the engine stop control of this example is applied to the vehicle 10, a workload for adaptation and a workload for evaluation can be reduced that are required for accommodating trade-offs (e.g., changes in engine stop shock and uncomfortable feeling associated with change in the lowering gradient of the engine rotation speed Ne) associated with changing the engine reduction torque Tmg1dn from the predetermined engine reduction torque Tmg1dnp.

According to this example, since the variation of the drive request amount corresponding to the accelerator operation is made slower during transition to stopping the rotation of the engine 12 as compared to when it is not during the transition, the state of the MG2 torque Tmg2 out of the tooth-hitting noise occurring region G can be maintained as long as possible to reduce occurrence frequency of the tooth-hitting noise associated with an accelerator operation performed during transition to stopping the rotation of the engine 12.

According to this example, if the drive request amount is varied such that the MG2 torque Tmg2 varies in the direction toward the tooth-hitting noise occurring region G during transition to stopping the rotation of the engine 12, the engine reduction torque Tmg1dn being applied by the first electric motor MG1 is changed such that the MG2 torque Tmg2 varies in the direction away from the tooth-hitting noise occurring region G and, therefore, this enables reduction in the occurrence frequency of the tooth-hitting noise associated with an accelerator operation performed during transition to stopping the rotation of the engine 12.

According to this example, if the engine reduction torque Tmg1dn is changed from the predetermined engine reduction torque Tmg1dnp, the engine reduction torque Tmg1dn is changed to one of a plurality of types of changed values that are set in correspondence to each value of the predetermined engine reduction torque Tmg1dnp causing the MG2 torque Tmg2 to stay in the tooth-hitting noise occurring region G, the engine reduction torque Tmg1dn is changed to a plurality of values to be changed relative to the predetermined engine reduction torque Tmg1dnp. This reduces a possibility of the MG2 torque Tmg2 being in the tooth-hitting noise occurring region G in accordance with variation of the drive request amount due to an accelerator operation performed during transition to stopping the rotation of the engine 12, thereby enabling reduction in the occurrence frequency of the tooth-hitting noise associated with an accelerator operation performed during transition to stopping the rotation of the engine 12.

According to this example, since the predetermined engine reduction torque Tmg1dnp is an adapted value predefined such that a gradient of variation is set to an optimum gradient of variation when the engine rotation speed Ne is reduced by the first electric motor MG1, the engine stop shock, the uncomfortable feeling, etc. are hardly given to a driver due to forcible reduction of the engine rotation speed Ne by the first electric motor MG1.

According to this example, since the tooth-hitting noise occurring region G is a torque region predefined as a range of the MG2 torque Tmg2 facilitating the occurrence of the tooth-hitting noise in the transmission portion 22, if the engine reduction torque Tmg1dn is applied by the first electric motor MG1 when the rotation of the engine 12 is stopped, the occurrence of the tooth-hitting noise can be suppressed or avoided while the drive request amount is realized.

Although the example of the present invention has been described in detail with reference to the drawings, the present invention is applied in other forms.

For example, although the vehicle 10 has the second electric motor MG2 indirectly coupled via the gear mechanism 34 to the output gear 30 in the example, this is not a limitation. For example, the present invention is applicable to a vehicle having the second electric motor MG2 directly coupled to the output gear 30 or a vehicle having the second electric motor MG2 coupled to a rotating member closer to the drive wheels 40 than the output gear 30 and indirectly coupled to the output gear 30 in a power transmittable manner.

Although the power distribution mechanism 32 is a single-planetary planetary gear device in the example, the power distribution mechanism 32 may be a double-planetary planetary gear device. The power distribution mechanism 32 may be a differential gear device in which a pinion rotationally driven by the engine 12 and a pair of bevel gears meshed with the pinion are operatively coupled to the first electric motor MG1 and the output gear 30, for example.

Although the power distribution mechanism 32 is a differential mechanism including one planetary gear device and having three rotating elements in the example, this is not a limitation. For example, the power distribution mechanism 32 may be a power distribution mechanism having two planetary gear devices coupled to make up a differential mechanism as a whole.

Figure 8:
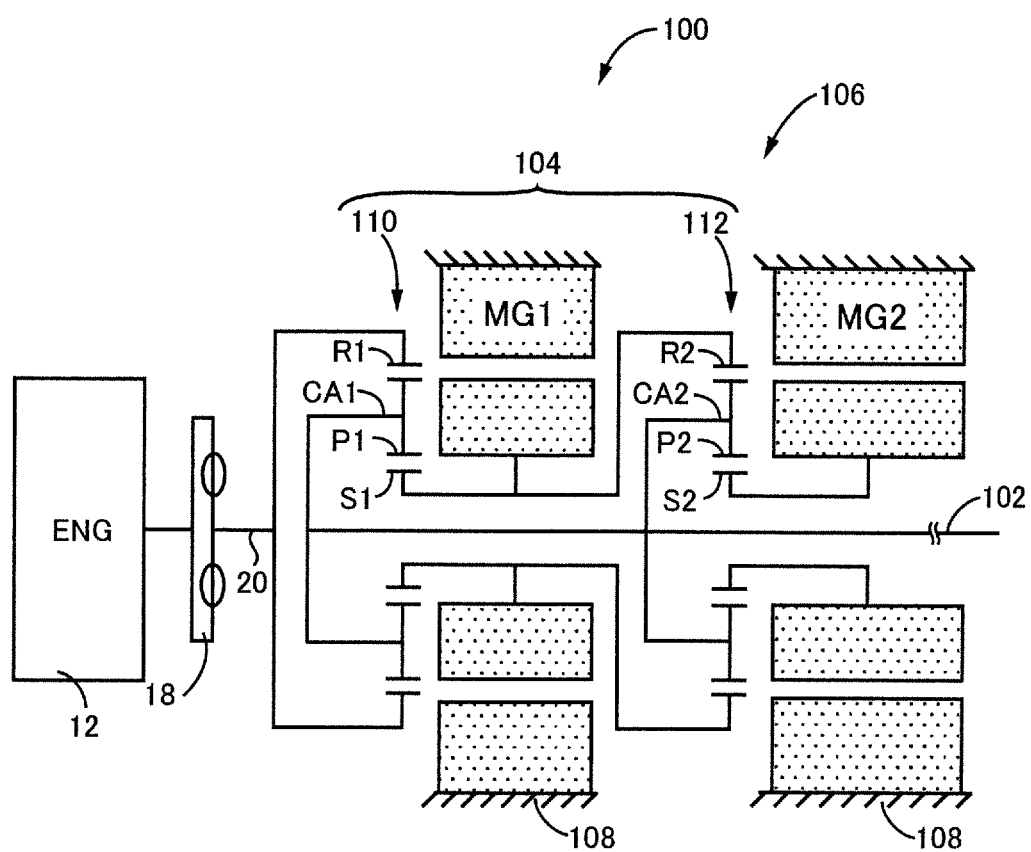
FIG. 8 is a diagram for explaining a general configuration of a hybrid vehicle to which the present invention is applied and is an example different from the vehicle of FIG. 1.

FIG. 8 is a diagram for explaining a general configuration of a hybrid vehicle 100 to which the present invention is applied and is a diagram of an example of the hybrid vehicle 100 including a power distribution mechanism having two planetary gear devices to make up a differential mechanism as a whole, depicting an example different from the vehicle 10 of FIG. 1. In FIG. 8, the hybrid vehicle 100 includes a transmission portion 106 having a power distribution mechanism 104 distributing the power output from the engine 12 to the first electric motor MG1 and an output shaft 102, and the second electric motor MG2 coupled to the output shaft 102 acting as an output rotating member in a power transmittable manner. The transmission portion 106 makes up a portion of a power transmission device in a case 108 acting as a non-rotating member attached to a vehicle body, for example. In this transmission portion 106, the power etc. of the engine 12 are transmitted from the output shaft 102 sequentially via a differential gear device, axles, etc. not depicted to drive wheels. The power distribution mechanism 104 includes a known single pinion type first planetary gear device 110 including the first sun gear S1, the first pinion gear P1, the first carrier CA1, and the first ring gear R1 as rotating elements, and a known single pinion type second planetary gear device 112 including the second sun gear S2, the second pinion gear P2, the second carrier CA2, and the second ring gear R2 as rotating elements. Specifically, the power distribution mechanism 104 has a first rotating element RE1 made up of the first sun gear S1 and the second ring gear R2 coupled to each other, a second rotating element RE2 made up of the first carrier CA1 and the second carrier CA2 coupled to each other, a third rotating element RE3 made up of the first ring gear R1, and a fourth rotating element RE4 made up of the second sun gear S2 as four rotating elements and acts as a differential mechanism generating a differential action as a whole. The power distribution mechanism 104 has the first electric motor MG1 coupled to the first rotating element RE1, the output shaft 102 coupled to the second rotating element RE2, the input shaft 20, i.e., the engine 12, coupled to the third rotating element RE3, and the second electric motor MG2 coupled to the fourth rotating element RE4. As a result, the transmission portion 106 acts as an electric differential portion with a differential state of the power distribution mechanism 104 controlled by controlling the operating state of the first electric motor MG1. In the transmission portion 106, the differential state of the power distribution mechanism 104 can be controlled by controlling the operating state of at least one electric motor of the first electric motor MG1 and the second electric motor MG2. The first planetary gear device 110 and the second planetary gear device 112 may be made up of double-planetary planetary gear devices.

Although each value is used as the rattling noise occurrence threshold value (A) for determining whether the MG2 torque Tmg2 is within the tooth-hitting noise occurring region G in the example, the rattling noise occurrence threshold value (A) may be a value having a hysteresis oriented to the direction of variation of the MG2 torque Tmg2.

In the flow chart of FIG. 7 of the example, the steps can be altered as needed within a range not causing inconvenience and, for example, the present invention is established even if the direction of setting the MG2 torque Tmg2 out of the tooth-hitting noise occurring region G is one of the positive and negative directions at S40, and the present invention is established even if S60 and S70 are not included.

The above description is merely an embodiment and the present invention can be implemented in variously modified and improved forms based on the knowledge of those skilled in the art.

NOMENCLATURE OF ELEMENTS

10: hybrid vehicle 12: engine 22: transmission portion (electric differential portion) 30: output gear (output rotating member) 32: power distribution mechanism (differential mechanism) 80: electric control device (control device) 100: hybrid vehicle 102: output shaft (output rotating member) 104: power distribution mechanism (differential mechanism) 106: transmission portion (electric differential portion) MG1: first electric motor MG2: second electric motor

What is claimed is:

1. A control device of a hybrid vehicle including an electric differential portion having a differential mechanism distributing power from an engine to a first electric motor and an output rotating member and a second electric motor coupled to the output rotating member in a power transmittable manner such that a differential state of the differential mechanism is controlled by controlling an operating state of the first electric motor, the control device of the hybrid vehicle causing the first electric motor to apply an engine reduction torque for reducing a rotation speed of the engine at a time of stopping a rotation of the engine, wherein
when it is determined that an output torque of the second electric motor is in a predetermined torque range near zero including zero during transition to stopping the rotation of the engine with the engine reduction torque applied by the first electric motor at the time of stopping the rotation of the engine being set to a predetermined engine reduction torque, the engine reduction torque applied by the first electric motor is changed from the predetermined engine reduction torque.

2. The control device of a hybrid vehicle of claim 1, wherein
the predetermined torque range is a torque range between negative and positive near-zero threshold values across zero, and wherein
when the output torque of the second electric motor is in the predetermined torque range during transition of stopping the rotation of the engine,
when the output torque of the second electric motor is closer to the positive near-zero threshold value of the predetermined torque range, the engine reduction torque applied by the first electric motor is changed to be smaller than the predetermined engine reduction torque, while
when the output torque of the second electric motor is closer to the negative near-zero threshold value of the predetermined torque range, the engine reduction torque applied by the first electric motor is changed to be larger than the predetermined engine reduction torque.

3. The control device of a hybrid vehicle of claim 1, wherein variation of a drive request amount corresponding to an accelerator operation is made slower during transition at the time of stopping the rotation of the engine as compared to when it is not during the transition.

4. The control device of a hybrid vehicle of claim 1, wherein when a drive request amount is varied such that the output torque of the second electric motor varies in a direction toward the predetermined torque range during transition of stopping the rotation of the engine, the engine reduction torque being applied by the first electric motor is changed such that the output torque of the second electric motor varies in a direction away from the predetermined torque range.

5. The control device of a hybrid vehicle of claim 1, wherein if the engine reduction torque is changed from the predetermined engine reduction torque, the engine reduction torque is changed to one of a plurality of types of changed values that are set in correspondence to each value of the predetermined engine reduction torque causing the output torque of the second electric motor to stay in the predetermined torque range.

6. The control device of a hybrid vehicle of claim 1, wherein the predetermined engine reduction torque is an adapted value predefined such that a gradient of variation is set to an optimum gradient of variation when the rotation speed of the engine is reduced by the first electric motor.

7. The control device of a hybrid vehicle of claim 1, wherein the predetermined torque range is a tooth-hitting noise occurring region predefined as a range of the output torque of the second electric motor facilitating occurrence of tooth-hitting noise in the electric differential portion.

8. A hybrid vehicle comprising:
an internal combustion engine;
an output rotating member;
a first electric motor;
a second electric motor coupled to the output rotating member in a power transmittable manner;
an electric differential portion having a differential mechanism distributing power from the engine to the first electric motor, wherein a differential state of the differential mechanism is controlled by controlling an operating state of the first electric motor; and
an electronic control unit configured to:
cause the first electric motor to apply an engine reduction torque for reducing-a rotation speed of the engine at a time of stopping a rotation of the engine, and
change the engine reduction torque applied by the first electric motor from a predetermined engine reduction torque when it is determined that an output torque of the second electric motor is in a predetermined torque range near zero including zero during transition to stopping the rotation of the engine with the engine reduction torque applied by the first electric motor at the time of stopping the rotation of the engine being set to the predetermined engine reduction torque.

9. The hybrid vehicle of claim 8, wherein
the predetermined torque range is a torque range between negative and positive near-zero threshold values across zero, and wherein
when the output torque of the second electric motor is in the predetermined torque range during transition of stopping the rotation of the engine,
> when the output torque of the second electric motor is closer to the positive near-zero threshold value of the predetermined torque range, the engine reduction torque applied by the first electric motor is changed to be smaller than the predetermined engine reduction torque, while
> when the output torque of the second electric motor is closer to the negative near-zero threshold value of the predetermined torque range, the engine reduction torque applied by the first electric motor is changed to be larger than the predetermined engine reduction torque.

10. The hybrid vehicle of claim 8, wherein variation of a drive request amount corresponding to an accelerator operation is made slower during transition at the time of stopping the rotation of the engine as compared to when it is not during the transition.

11. The hybrid vehicle of claim 8, wherein when a drive request amount is varied such that the output torque of the second electric motor varies in a direction toward the predetermined torque range during transition of stopping the rotation of the engine, the engine reduction torque being applied by the first electric motor is changed such that the output torque of the second electric motor varies in a direction away from the predetermined torque range.

12. The hybrid vehicle of claim 8, wherein if the engine reduction torque is changed from the predetermined engine reduction torque, the engine reduction torque is changed to one of a plurality of types of changed values that are set in correspondence to each value of the predetermined engine reduction torque causing the output torque of the second electric motor to stay in the predetermined torque range.

13. The hybrid vehicle of claim 8, wherein the predetermined engine reduction torque is an adapted value predefined such that a gradient of variation is set to an optimum gradient of variation when the rotation speed of the engine is reduced by the first electric motor.

14. The hybrid vehicle of claim 8, wherein the predetermined torque range is a tooth-hitting noise occurring region predefined as a range of the output torque of the second electric motor facilitating occurrence of tooth-hitting noise in the electric differential portion.

\* \* \* \* \*